United States Patent [19]

Lloyd et al.

[11] Patent Number: 5,294,085
[45] Date of Patent: Mar. 15, 1994

[54] SHOCK AND VIBRATION ISOLATION APPARATUS FOR MOTOR VEHICLE SEATS

[75] Inventors: David Lloyd, Prescott, Wis.; Ronald J. Geiser, Hastings, Minn.

[73] Assignee: Comfort Ridge USA, Inc., Bloomington, Minn.

[21] Appl. No.: 973,885

[22] Filed: Nov. 10, 1992

[51] Int. Cl.⁵ .............................................. F16M 13/00
[52] U.S. Cl. .................................... 248/562; 248/550; 248/429
[58] Field of Search ............... 248/562, 566, 575, 614, 248/619, 631, 550, 429; 297/344.19, 344.12, 344.13, 344.16, 344.24

[56] References Cited

U.S. PATENT DOCUMENTS

| | | | |
|---|---|---|---|
| 3,059,890 | 10/1962 | Radke et al. | 248/575 X |
| 3,479,099 | 11/1969 | Krause | 248/429 X |
| 3,951,373 | 4/1976 | Swenson et al. | |
| 3,954,245 | 5/1976 | Costin . | |
| 3,990,668 | 11/1976 | Thompson et al. | |
| 4,194,716 | 3/1980 | Barecki et al. | 248/575 |
| 4,196,483 | 4/1980 | Lefler et al. | |
| 4,198,025 | 4/1980 | Lowe et al. | |
| 4,213,594 | 7/1980 | Pietsch et al. | |
| 4,363,377 | 12/1982 | Van Gerpen . | |
| 4,384,700 | 5/1983 | Thompson et al. | |
| 4,461,444 | 7/1984 | Grassl et al. | 248/550 |
| 4,497,078 | 2/1985 | Vogel et al. | |
| 4,589,620 | 5/1986 | Sakamoto | 248/550 |
| 4,638,982 | 1/1987 | Mischer et al. | |
| 4,684,100 | 8/1987 | Grassl . | |
| 4,729,538 | 3/1988 | Bergacker et al. . | |
| 4,733,847 | 3/1988 | Grassl . | |
| 4,793,583 | 12/1988 | Bergacker et al. . | |
| 4,941,641 | 7/1990 | Granzow et al. | 248/161 X |
| 4,954,051 | 9/1990 | Smith et al. | 248/631 X |
| 4,969,624 | 11/1990 | Ustelentsev et al. | 248/550 |
| 5,004,206 | 4/1991 | Anderson | 248/631 X |
| 5,076,529 | 12/1991 | Dove et al. | 248/429 |
| 5,176,355 | 1/1993 | Carter | 248/550 |
| 5,199,690 | 4/1993 | Marshall | 248/619 X |

Primary Examiner—Karen J. Chotkowski
Attorney, Agent, or Firm—Haugen and Nikolai

[57] ABSTRACT

A seat assembly for a motor vehicle includes an air suspension system for effectively isolating the occupant of the seat from shock, vibration and inertial forces directed along both a vertical axis and a horizontal axis. A base plate is mounted to the floor of the vehicle and supports first and second pairs of sleeve bearings on opposed sides of a box-like housing. The housing itself is attached to a pair of guide rods which cooperate with the sleeve bearings to provide fore and aft movement of the housing. Springs operating in cooperation with a first horizontally disposed air bag serves to dampen out inertial forces on the vehicle seat The seat itself it support atop a vertically oriented air spring and a plurality of hydraulic vibration dampeners that tend to cushion vertically directed force spectors acting upon the seat and its occupant.

17 Claims, 4 Drawing Sheets

SHOCK AND VIBRATION ISOLATION APPARATUS FOR MOTOR VEHICLE SEATS

BACKGROUND OF THE INVENTION

I. Field of the Invention

This invention relates generally to vehicle seats, and more particularly to vehicle seats which are effectively isolated from the effects of road shock and forces due to sudden acceleration and deceleration of the vehicle.

II. Discussion of the Prior Art

It is well known that semi-tractor trucks and other truck-type commercial vehicles tend to have a relatively stiff suspension system, whereby shock and vibration forces occasioned from traversing road bumps and the like are effectively transmitted to the driver and/or passenger in the vehicle. Likewise, when traveling at normal highway speeds and especially during acceleration and deceleration, there is a tendency for the driver or passenger to be lurched forward or rearward, depending upon the magnitude of the deceleration and acceleration vectors.

To improve the comfort of the ride, it is desirable, as much as possible, to isolate the seat occupant from these types of inertial forces. There are disclosed in the prior art various systems for isolating a vehicle driver or passenger from bouncing or jolting in the vertical direction, but compensation for fore and aft translation due to acceleration and deceleration have not been addressed. For example, in the Thompson et al. U.S. Pat. No. 3,990,668, a vehicle seat is described which incorporates a hydraulic actuator coupled in circuit with a valve whose spool is directly connected by linkages to the seat. The valve is operative to change the response of an accumulator coupled to the actuator so as to cushion the ride and to accommodate large excursions from a predetermined ride position due to major shocks. The Thompson et al. reference has no provision for cushioning or dampening fore and aft movement of the seat system. Other patents incorporating pneumatic cylinders or air bags operate strictly to adjust the height of the seat above the floor so as to accommodate drivers/passengers of differing physical stature. In this regard, reference is made to the Costin U.S. Pat. No. 3,954,245 and the Misher et al. U.S. Pat. No. 4,638,982. Neither of these patents teaches a seat construction for minimizing or nulling out fore and aft sway of the seat under breaking and acceleration conditions, respectively.

OBJECTS

It is accordingly a principal object of the present invention to provide an improved seat arrangement for a motor vehicle.

Another object of the invention is to provide an improved seat arrangement for a motor vehicle in which separate controls establish the fore and aft position of the seat cushion above the floor while pneumatic/hydraulic mechanisms operate to establish the initial height of the seat and to minimize the effect of vertically directed force vectors acting upon the seat and its occupant.

Yet another object of the invention is to provide an improved seat arrangement which also incorporates means for compensating force vectors directed horizontally due to breaking and acceleration.

Still another object of the invention is to provide an improved shock/vibration isolation mechanism for a vehicle seat which is relatively low cost, yet reliable in operation and easy to service.

SUMMARY OF THE INVENTION

The foregoing features, objects and advantages of the invention are achieved by providing a seat assembly which is adapted to be attached to the floor of a motor vehicle, such as a semi-tractor. The assembly includes a base or mounting plate which is designed to be attached to the vehicle's floor board and it, in turn, supports a box-like housing which is free to slide in the fore and aft direction in a controlled fashion, determined by a pair of compression springs working in opposition to a pneumatically-controlled air spring. The air spring is operatively disposed between the fixed, truck-mounted frame and the slide-mounted box-like housing.

Mounted on a pedestal within the box-like housing is a second air spring having its operational axes in the vertical direction. This vertically oriented air spring supports another frame which is slide mounted and free to move back and forth in the fore and aft direction when manually unlatched by the seat's occupant. The seat cushion is secured to that latter slide assembly.

The relative height of the vertically displaceable seat-supporting frame is controlled by the vertically disposed air spring. Once the neutral position is established, further inflating and deflating, under control of a three-position pneumatic valve coupled in fluid circuit with the vertically disposed air bag effects a cushioning of the vertically directed forces. In particular, the valve preferably has a control element coupled to the vertically movable frame for placing the valve in a first state to inflate the air bag when the vertical height of the seat drops below a first pre-established height to thereby raise it. The valve is also arranged to exhaust air from the bag when the seat height moves above a second pre-established limit to thereby decrease the elevation. When the control level is in the neutral zone, air neither enters nor leaves the bag, maintaining the seat height at the pre-established neutral position. Suitable hydraulic cylinders are operatively disposed between the floor of the box-like housing and the vertically displaceable frame serves to dampen out any tendency for the seat to oscillate in the vertical direction. The horizontally disposed air spring acts to cushion horizontal motions of the seat due to acceleration, braking and other generally horizontally directed forces encountered in the over-the-road travel.

DESCRIPTION OF THE DRAWINGS

The invention will be better understood from the following detailed description of a preferred embodiment, especially when considered in conjunction with the accompanying drawings in which.

DESCRIPTION OF THE PREFERRED EMBODIMENT

Figures 1, 2:
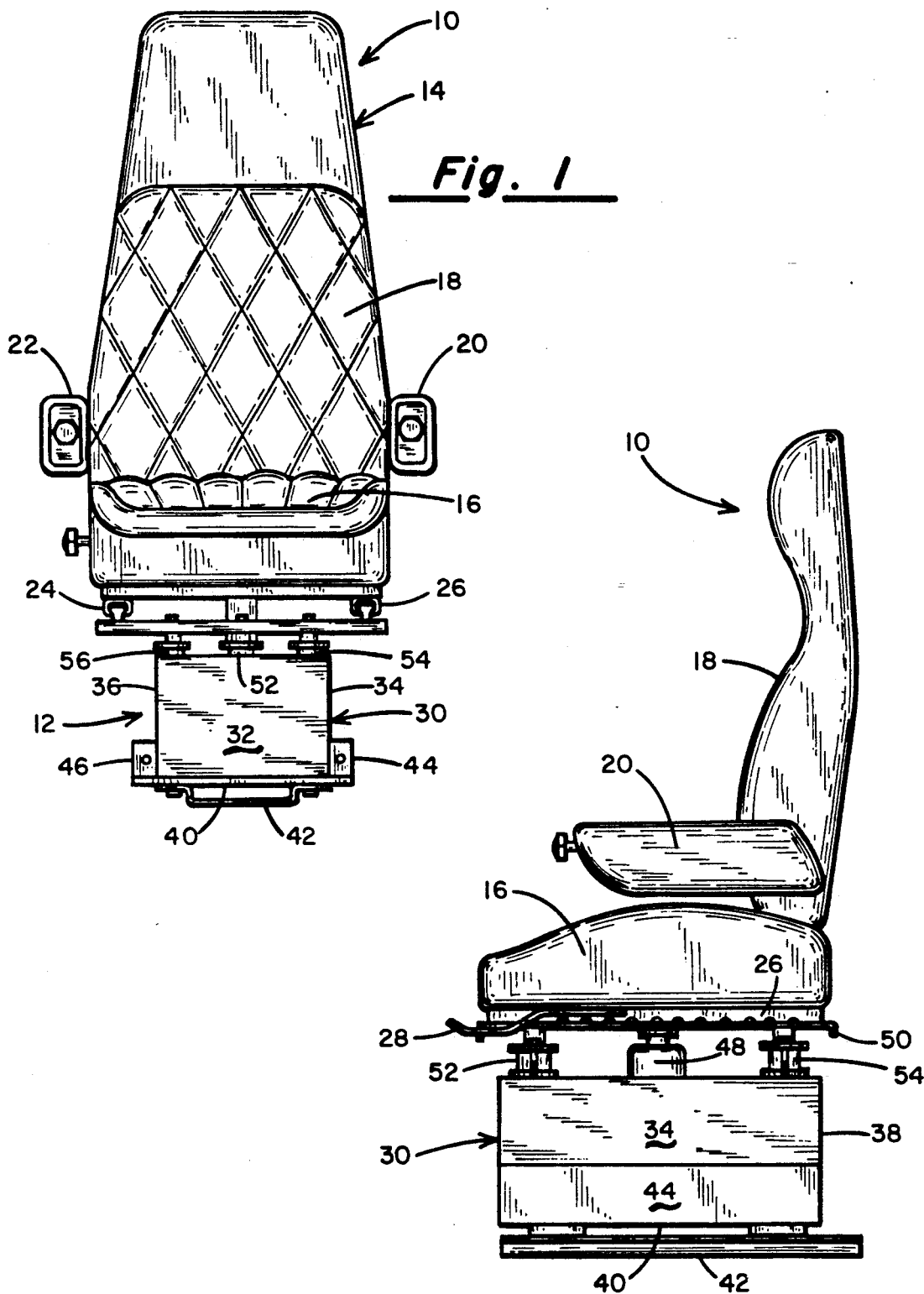
FIG. 1 is a front view of the vehicle seat assembly of the present invention.
FIG. 2 is a side view of the vehicle seat of the present invention.

Referring first to the front and side views of the seat assembly shown in FIGS. 1 and 2, the assembly itself is indicated generally by numeral 10, and includes a base or pedestal 12 having an upholstered seat 14 The upholstered seat is conventional and includes a seat cushion 16 and a seat back 18. The seat back and cushion include appropriately contoured foam material which is covered by a suitable decorative and functional fabric. Arm rests 20 and 22 may also be provided. These are designed to be swung in the horizontal disposition shown to a vertical disposition generally aligned with the seat back 18. As will be described in greater detail below, the bottom panel of the seat cushion 16 is fastened to a pair of slide rails 24 and 26. By manipulating a latch lever 28, the driver or occupant may set the seat position at a desired location in the fore and aft direction to accommodate the occupant's stature.

The seat pedestal is seen to comprise a box-like housing 30 having a front panel 32, left and right side panels 34 and 36, and a rear panel 38, each of which project vertically upward from a floor member 40. Disposed beneath it is a mounting plate 42 which is adapted to be bolted to the floor of the vehicle. Left and right box-like covers 44 and 46 extend the length of the pedestal along the sides 34 and 36 and serve to shield or house a slide assembly, all as will be more fully described as the description of the preferred embodiment progresses.

With reference to FIG. 2, it can be seen that there is centrally disposed within the box-like housing 30 a vertically oriented air spring 48 operatively connected between the floor 40 of the housing and a vertically displaceable plate 50 on which the slide assemblies 24 and 26 are attached. Thus, inflation and deflation of the air spring 48 function to raise and lower the seat 14. Also disposed between the floor 40 and the plate 50 and contained within the box-like housing 30 are three hydraulic dampeners 52, 54 and 56.

Figure 3:
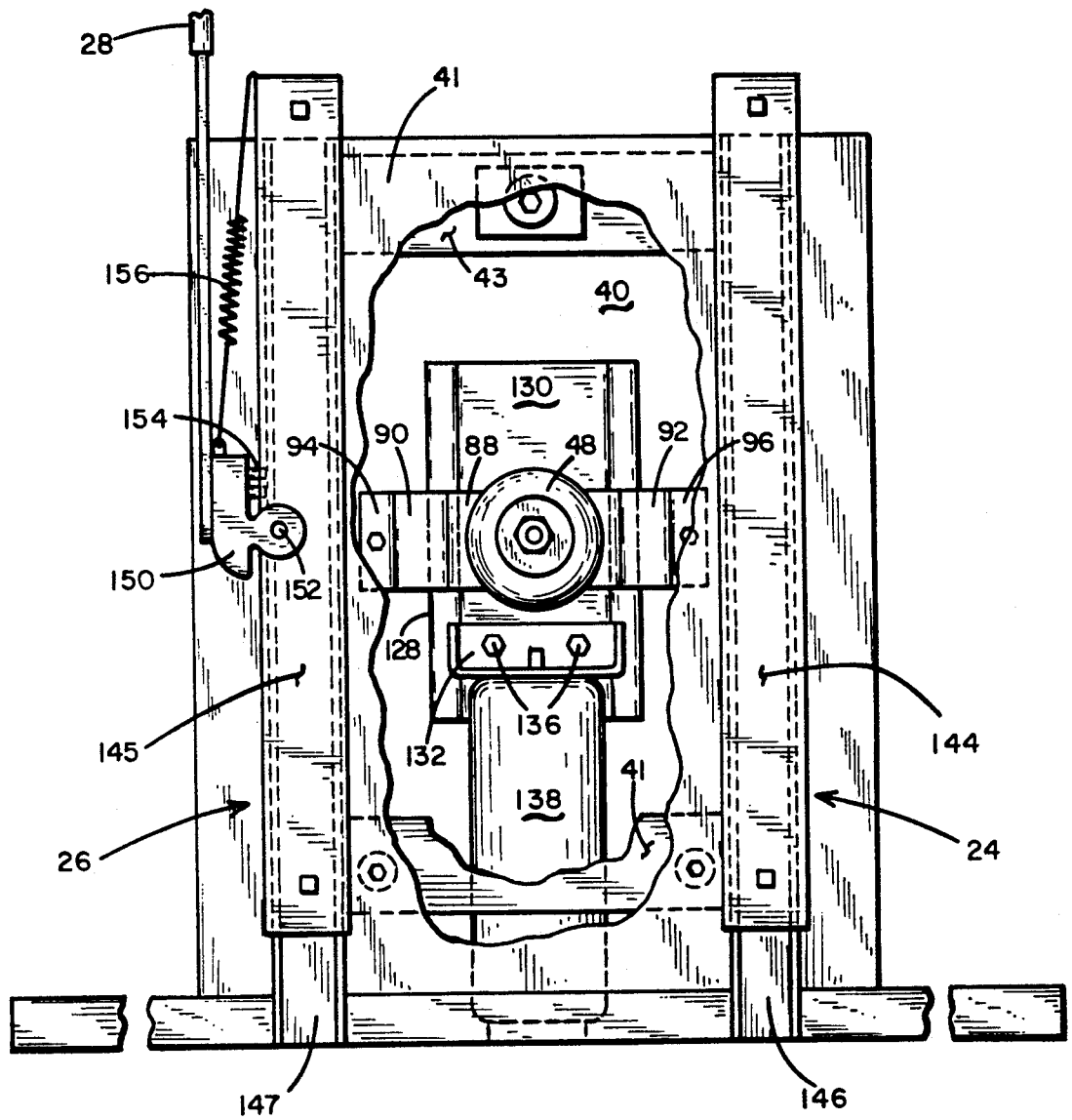
FIG. 3 is a top plan view of the apparatus of FIG. 1 with the upholstered seat and seat back removed and with sections broken away to illustrate the underlying parts.
Figure 4:
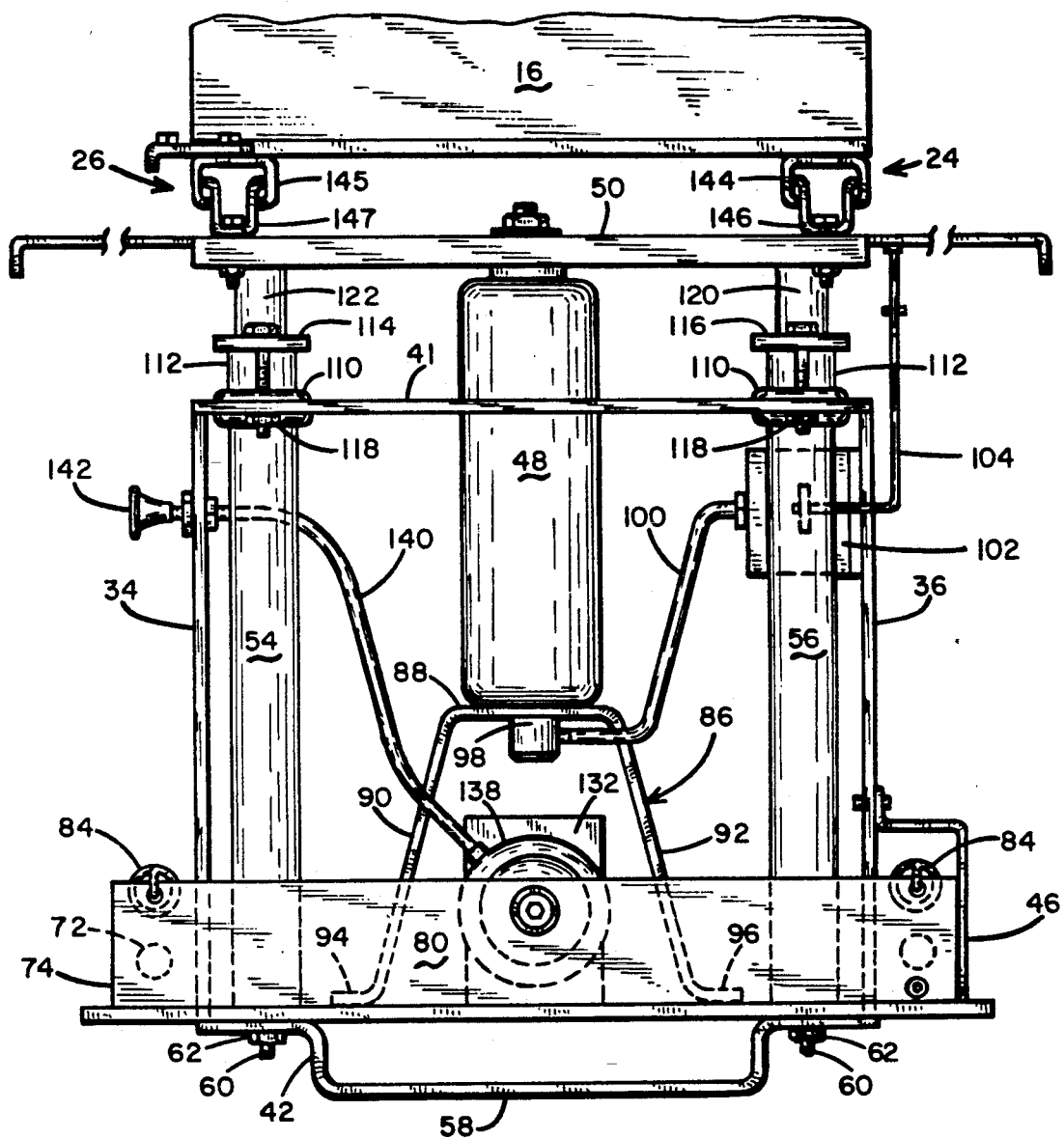
FIG. 4 is a rear view of the vehicle seat assembly with the housing's rear panel removed.
Figure 5:
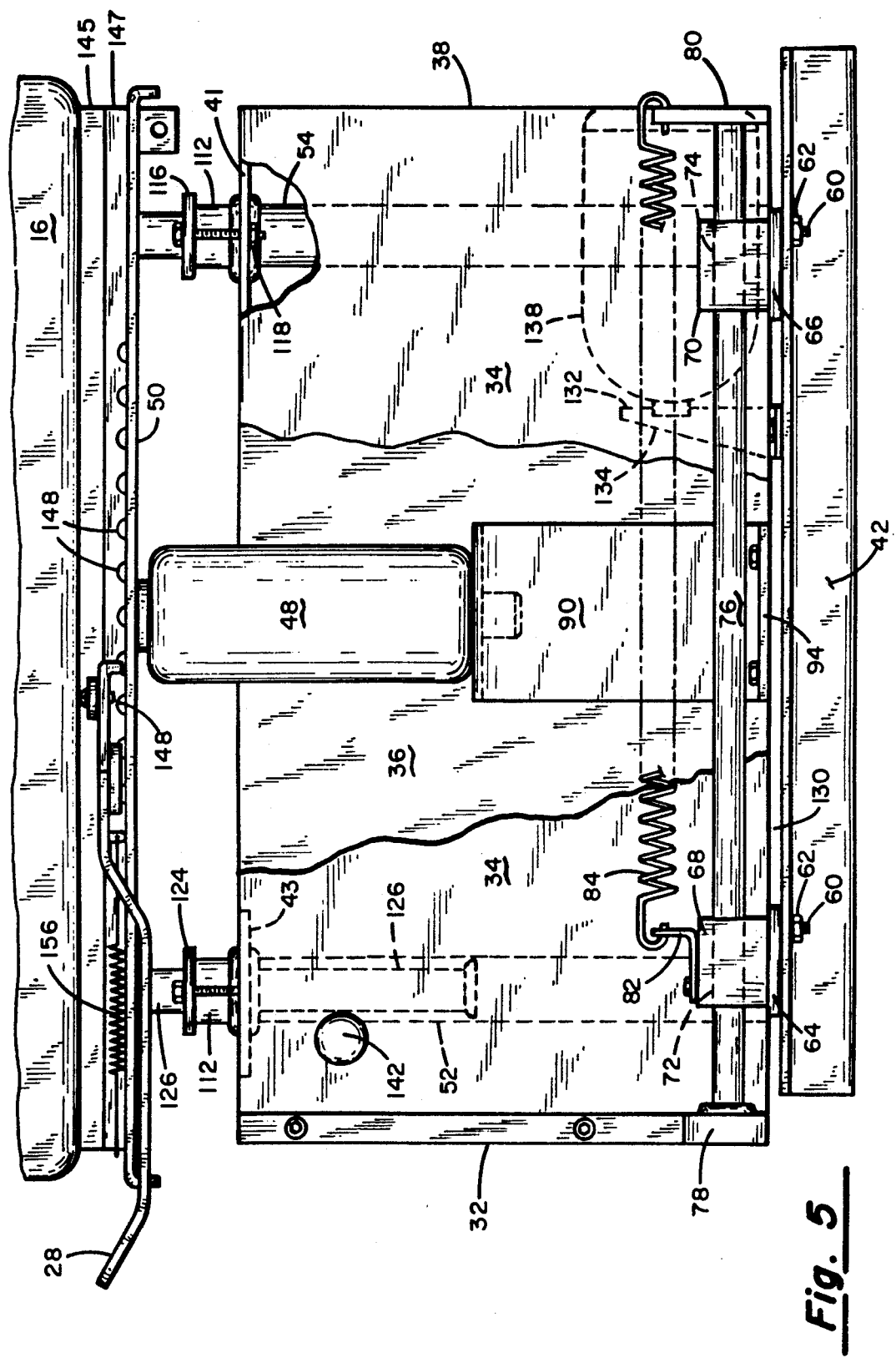
FIG. 5 is a left side view that is partially broken away to illustrate internal parts.

Having generally described the overall constructional of the seat assembly of the present invention, a more detailed description thereof will be provided in discussing the enlarged views of FIGS. 3 through 5. The mounting plate 42 is seen to comprise a channel having a base 58 which is arranged to abut the floor of the vehicle and which includes appropriately tapped and threaded holes (not shown), allowing the seat to be bolted securely to the floor of the vehicle. Bolts 60 and nuts 62 passing through flanges formed on the terminal ends of the up-turned portions of the base plate 58 secure the base plate to transversely extending front and rear bearing support bars 64 and 66, respectively. Attached to the upper surface of the transversely extending bars 64 and 66 are bearing blocks 68 and 70 and which are best visible in the side view of FIG. 5. Similar bearing blocks (not shown) are disposed on the right end portions of the transversely extending bearing support bars 64 and 66 also. The bearing blocks 68 and 70 include sleeve bearings 72 and 74 in which is received a smooth, polished cylindrical slide rod, such as slide rod 76 therethrough. A similar slide rod passes through the bores of the bearing blocks on the right side of the pedestal assembly as well. The slide rod 76 is supported at each end by reinforcing bars 78 and 80 which extend along the lower edge of the front and rear panels 32 and 38, respectively. It can be appreciated, now, that the box-like housing 30 is capable of reciprocating in the fore and aft direction relative to the mounting plate 42.

Attached to the upper surface of the bearing block 68 is a bracket 82. A tension spring 84 extends between it and the rear enforcing bar 80. The spring thus urges the box-like housing 30 toward the front of the vehicle in which the present invention is installed. An identical spring arrangement is disposed on the right side of the housing within the shield 46. Affixed to the floor 40 of the housing 30 is a bracket 86. It has a pedestal surface 88 and opposed downwardly and outwardly extending legs 90 and 92. The terminal portion of the legs 90 and 92 are bent to form flanges 94 and 96 which are bolted or welded to the floor 40 of the housing. Affixed to the pedestal portion 88 of the bracket 86 is the vertically oriented air spring 48. It includes a pneumatic fitting 98 having a hose 100 leading to a three-positioned valve 102. The valve 102 is controlled by a linkage arm 104 which couples it to the plate 50 to which the slide brackets 24 and 26 are joined. As the upholstered seat 14 moves up and down, the valve may be shifted between its three positions. In a first position, the down position, air is allowed to flow through the hose 100 to inflate the air spring 48 causing the plate to be elevated. When the linkage is in its up position, air is bled from the air spring 48 causing the plate 50 to move downward. When the linkage is in its intermediate position, air neither enters nor leaves the air spring 48, thus maintaining the seat in its normal or neutral position.

With continued reference to FIG. 4, the manner in which the hydraulic dampeners 54 and 56 are installed will be explained. The cylinders 112 of the three dampeners are bolted at their lower ends to the floor 40 of the box-like housing 30. They extend upward and pass through circular openings formed in cover plates 41 and 43 which extend between and are welded to the upper side walls of the side panels 34 and 36. A rubber grommet as at 110 fits into each of the openings and surrounds the cylinder portion 112 of the dampeners. Clamping plates 114 and 116 abut the upper surface of the cylinders 112. When the nuts 118 are tightened onto their associated bolts, the cylinders of the dampeners 54 and 56 are forced downward, securely clamping them between the clamping plates 114, 116 and the floor 40 of the unit.

The clamping plates 114 and 116 include a cylindrical bore or aperture therethrough sufficiently large to permit the piston rods 120 and 122 to pass therethrough. The upper ends of the piston rods 120 and 122 are affixed to the vertically movable plate 50, and thus are effectively in parallel with the vertically oriented air spring 48. In a similar fashion, the cylinder 112 of the hydraulic dampener 52 located near the front panel 32 of the box-like enclosure is clamped in place using a clamping plate 124 and a pair of bolts passing through it and into the transversely extending top plate 43. The piston rod 126 of the cylinder 52 also attaches to the support plate 50 at the front of the pedestal.

By referring to the top view of FIG. 3, the floor 40 of the box-like enclosure is seen to have a rectangular opening 128 formed through it which exposes the longitudinally extending center brace 130 beneath it. The center brace 130 is integrally formed with the transversely extending plates 64 and 66 to effectively form a letter H pattern. A L-shaped bracket 132 having reinforcing side gussets 134 is bolted to the strap member 130 by bolts 136. Bracket 132 projects upwardly through the rectangular opening 128 and acts as a stop and support for the forward end of a horizontally oriented air sleeve type spring 138. The other end of the air spring 138 is affixed to and supported by the transversely extending vertical plate 80 extending along the rear face of the box or housing 30. The air spring 138 is thus effectively coupled in parallel with the tension springs 84 and the slide rods inside the protective shields 44 and 46.

In the rear view of FIG. 4, a suitable tube 140 couples the air spring 138 to a manually operated control valve having an actuating knob 142. That control valve is also coupled by a suitable pneumatic hose to a source of compressed air, such as the supply used in conjunction with the vehicle's air brake system. a pressure regulator may be used to adapt the vehicle's pressure system to the air springs 48 and 138. By manipulating the knob 142, the cushioning effect of the air spring 138 can be adjusted so as to effectively dampen out the vibrational motions in the fore and aft direction which may be encountered during over-the-road travel.

The slide rails 24 and 26 for supporting the upholstered seat 16 on the vertically moveable plate 50 comprise an upper C-shaped channel 144 and 145 bolted to the underside of the seat 16. The elongated C-shaped channels fit over the outwardly extending flanges of U-shaped channels 146 and 147 which are bolted to the upper surface of the vertically moveable plate 50. Because of the manner in which the channels 144–145 and 146–147 interact, the two can slide back and forth relative to one another but cannot be separated except by sliding the two apart at their respective ends. As can be seen in FIG. 5, the lower U-shaped channel 147 has a plurality of notches 148 formed at regularly spaced intervals along its length. The top view of FIG. 3 shows a latch plate 150 pivotally joined by a rivet or pin 152 to the upper surface of the C-shaped channel 145. The lever 28 joins to the latch plate 150 which also has a pair of fingers 154 positioned to penetrate through a pair of adjacent notches 148 when the latch plate 150 is urged to the position shown in FIG. 3 by the spring 156.

OPERATION

Now that the details of the mechanical construction of the seat assembly 10 of the present invention has been described, consideration will next be given to its mode of operation.

Upon entering the vehicle, if the driver determines that, for comfort, the seat and seat back should be repositioned to provide a comfortable distance between the truck's clutch, brake and accelerator, the operator may displace the actuator lever handle 28 relative to the side of the seat and, in doing so, will pivot the latch member 150 about a pin 152 causing fingers 154 on latch member 150 to disengage from a pair of the notches 148 formed through the wall of the channel member 147 attached to the upper surface of the plate 50. With the fingers disengaged, the seat may be slid forward or rearward to a desired position. Releasing the lever 28 allows the return spring 156 to pull the fingers 154 of the latch plate 150 back into engagement with the serrated openings on the slide member 147, thus again locking the mating slide channels to one another.

During vehicle travel, forces acting in the fore and aft direction will be effectively cushioned by the horizontally disposed air spring 138. The force of the coil springs 84 normally urge the sliding box-like housing to the rear against the forward directed force afforded by the air spring 138.

The vertically directed air spring 48 along with the three hydraulic dampeners 52, 54 and 56 are used to dampen out any vertically directed forces which the vehicle may encounter, thus tending to isolate the occupant of the seat assembly from vertically directed shock and vibration. For example, upon hitting a bump in the road, a tendency exists for the seat 16 and the occupant to be lifted relative to the truck's floor. The upward motion of the seat operates the automatic three-way valve 102 to release air from the vertically directed air spring 48, thus allowing the seat to fall slightly. Similarly, if during travel, the truck should encounter a depression in the road, such as, for example, a pot hole, there is a downward directed force which causes the automatic valve to a position in which more air is introduced into the spring 48 to lift the seat relative to its base. Thus, the downwardly directed force is compensated for by an upward movement of the seat due to inflation of the air spring 48. The hydraulic cylinders 52, 54 and 56 not only maintain the bottom of the seat in a level plane, but they tend to dampen out any tendency for the seat to vibrate or oscillate due to sudden vertically directed forces impinging on the seat.

Each of the dampeners employed include a cylinder that is filled with a heavy oil or grease. A ball-shaped piston contained within the cylinder has a predetermined clearance between its surface and the walls of the cylinder containing it. As the piston moves downward, it attempts to compress ht grease, thus extruding it through the clearance space between the piston and cylinder. Likewise, when the piston attempts to move upward, the grease is extruded through the space between the piston and cylinder yielding a resistance to movement and providing the desired dampening effect.

It can seen, then, that the present invention provides an improved, flexible and efficient apparatus for mounting a seat within a motor vehicle which functions to effectively isolate the occupant from bearing shock and vibration commonly encountered by semi-truck drivers. The result is that there is less fatigue experienced by the driver and improved highway safety.

This invention has been descried herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A seat assembly adapted to be mounted on the floor of a motor vehicle comprising, in combination:
    (a) a base member attachable to the floor of a motor vehicle;
    (b) a box-like housing slidingly mounted on said base member for movement in a fore and aft direction relative to said motor vehicle, said housing having a floor and four mutually perpendicular side walls;
    (c) a vertically displaceable frame;
    (d) a seat supporting frame;
    (e) slide means for mounting said seat supporting frame to said vertically displaceable frame;
    (f) first air spring means supported in said box-like housing and engaging said vertically displaceable frame for controlling vertical movement of said vertically displaceable frame and said seat supporting frame; and (g) second air spring means operatively disposed between said base member and said box-like housing for controlling movement of said box-like housing in the fore and aft direction.

2. The seat assembly as in claim 1 and further including:

(a) at least one tension spring operatively coupled between said base member and said box-like housing for restraining movement of said box-like housing in the fore direction.

3. The seat assembly as in claim 1 and further including:

(a) at least one hydraulic dampener, said dampener including a tubular cylinder means containing a viscous fluid and with a piston means disposed in said tubular cylinder with a predetermined tolerance between the inner wall of said tubular cylinder means and said piston; and (b) means coupling one of said piston means and cylinder means to said floor of said box-like housing and the other of said piston means and cylinder means to said vertically displaceable frame.

4. The seat assembly as in claim 1 and further including a plurality of hydraulic dampeners, each of said dampeners including:

(a) at least one hydraulic dampener, said dampener including a tubular cylinder means containing a viscous fluid and a piston means disposed in said tubular cylinder with a predetermined tolerance between the inner wall of said tubular cylinder means and said piston; and (b) means coupling one of said piston means and cylinder means to said floor of said box-like housing and the other of said piston means and cylinder means to said vertically displaceable frame.

5. The seat assembly as in claim 1 and further including:

(a) manually operable latch means coupled to said slide means for selectively locking said seat supporting frame to said vertically displaceable frame at a desired position in the fore and aft direction.

6. The seat assembly as in claim 1 and further including:

(a) means for controlling the selective inflation and deflation of said first and second air spring means.

7. The seat assembly as in claim 6 wherein the means for controlling the selective inflation of said second air spring means includes a manually operated pneumatic valve.

8. The seat assembly as in claim 6 wherein the means for controlling the selective inflation of said first air spring means includes:

(a) a three-position valve coupled between a compressed air source and said first air spring for inflating said first air spring when said three-position valve is in a first position, deflating said first air spring when said three position valve is in a second position, and maintaining the state of inflation of said first air spring means when said three-position valve is in its third position.

9. The seat assembly as in claim 8 and further including linkage means for coupling said vertically displaceable frame to said three position valve to shift said three position valve between its positions determined by the relative distance between said vertically displaceable frame and said base member.

10. The seat assembly adapted to be mounted on the floor of a motor vehicle comprising, combination:

(a) a base member attachable to the floor of a motor vehicle;

(b) a box-like housing supported by slide means on said base member allowing said housing to move in the fore and aft direction;

(c) spring means coupled between said base member and said box-like housing for biasing said housing in one direction;

(d) a first air spring member contained within said box-like housing and operatively coupled between said base member and said box-like housing and operating against the force of said spring means;

(e) a vertically displaceable frame;

(f) a second air spring member disposed in said housing and cooperating with said vertically displaceable frame for controlling the height of said vertically displaceable frame relative to said base member; and (g) hydraulic dampening means disposed in said housing and cooperating with said vertically displaceable frame for suppressing oscillating movement of said vertically displaceable frame.

11. The seat assembly as in claim 10 wherein said box-like housing includes a floor, mutually perpendicular side and end walls and a top wall and said slide means comprises first and second pairs of spaced, coaxially aligned sleeve bearings affixed to said base member adjacent said side walls on opposed sides of said box-like housing and a pair of slide rods individually attached at opposed ends to said end walls on opposite sides of said box-like housing and passing through said sleeve bearings.

12. The seat assembly as in claim 11 wherein said spring means comprises first and second tension springs extending parallel to respective ones of said pair of slide rods.

13. The seat assembly as in claim 11 wherein said floor of said box-like housing includes an opening therethrough and wherein said air spring member includes a bracket affixed to said base member and projecting upwardly through said opening in said floor and an air spring extending horizontally between said bracket and one of said end walls of said box-like housing.

14. The seat assembly as in claim 11 and further including:

(a) a pair of slide rails affixed to said vertically displaceable frame and extending parallel to said side walls of said box-like housing; and (b) an upholstered seat mounted on said pair of slide rails.

15. The seat assembly as in claim 14 and further including latch means coupled to said slide rails for locking and unlocking said upholstered seat relative to said vertically displaceable frame.

16. The seat assembly as in claim 14 wherein said hydraulic dampening means includes a tubular right circular cylinder containing a viscous liquid therein and a piston having a piston rod extending therefrom said piston having a diameter of a predetermined size less than the internal diameter of said tubular cylinder such that reciprocating movement of said piston rod extrudes said viscous liquid between said piston and the inner wall of said cylinder, one of said cylinder and piston rods being affixed to said vertically displaceable frame and other of said cylinder and piston rod being affixed to said floor.

17. The seat assembly as in claim 10 and further including means for controlling inflating said first and second air spring members.

* * * * *